United States Patent
VanDuyn et al.

(10) Patent No.: US 9,544,624 B2
(45) Date of Patent: Jan. 10, 2017

(54) TEMPORARY SUBSCRIPTION ACCESS VIA AN ALTERNATE TELEVISION RECEIVER

(71) Applicant: EchoStar Technologies L.L.C., Englewood, CO (US)

(72) Inventors: Luke VanDuyn, Highlands Ranch, CO (US); Henry Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 238 days.

(21) Appl. No.: 14/176,445

(22) Filed: Feb. 10, 2014

(65) Prior Publication Data
US 2015/0230004 A1   Aug. 13, 2015

(51) Int. Cl.
| | |
|---|---|
| H04N 7/173 | (2011.01) |
| H04N 7/16 | (2011.01) |
| H04N 21/254 | (2011.01) |
| H04N 21/258 | (2011.01) |
| H04N 21/6334 | (2011.01) |
| H04N 21/414 | (2011.01) |
| H04N 21/422 | (2011.01) |
| H04N 21/426 | (2011.01) |
| H04N 21/45 | (2011.01) |
| H04N 21/658 | (2011.01) |
| H04N 21/472 | (2011.01) |

(52) U.S. Cl.
CPC .... *H04N 21/2541* (2013.01); *H04N 21/25875* (2013.01); *H04N 21/41407* (2013.01); *H04N 21/42204* (2013.01); *H04N 21/42684* (2013.01); *H04N 21/4532* (2013.01); *H04N 21/6334* (2013.01); *H04N 21/6582* (2013.01); *H04N 21/25841* (2013.01); *H04N 21/47211* (2013.01)

(58) Field of Classification Search
CPC ............ H04N 21/4532; H04N 21/4751; H04N 21/42204; H04N 21/43615; H04N 21/4753; H04N 5/4403; H04N 21/47211; H04N 21/2225
See application file for complete search history.

(56) References Cited

U.S. PATENT DOCUMENTS

| | | | |
|---|---|---|---|
| 8,341,686 B2 | 12/2012 | Hale et al. | |
| 2005/0028208 A1* | 2/2005 | Ellis | H04N 7/163 725/58 |
| 2010/0115540 A1* | 5/2010 | Fan | H04N 21/25816 725/1 |

\* cited by examiner

*Primary Examiner* — Pankaj Kumar
*Assistant Examiner* — Alazar Tilahun
(74) *Attorney, Agent, or Firm* — Kilpatrick Townsend & Stockton LLP

(57) ABSTRACT

Various arrangements that permit temporary subscription porting are presented. A temporary subscription port request may be submitted by a subscriber. The temporary subscription port request may include an identifier of a visitor television receiver and authentication information for the subscriber. In response to the temporary subscription port request, a first command to a home television receiver may be transmitted that disables viewing a first set of television channels linked with the subscriber's subscription account. In response to the temporary subscription port request, a second command to the visitor television receiver may be transmitted that enables viewing the first set of television channels linked with the subscriber's subscription account.

15 Claims, 7 Drawing Sheets

US 9,544,624 B2

TEMPORARY SUBSCRIPTION ACCESS VIA AN ALTERNATE TELEVISION RECEIVER

BACKGROUND

Television subscriptions are typically immobile. For instance, if a subscriber orders a particular package of television channels, the subscriber is typically locked into viewing those television channels via user equipment located at the address associated with the subscriber's subscription, such as the subscriber's home. An occasion may arise where the subscriber may desire to view a television channel at a location other than the address associated with his subscription.

SUMMARY

In some embodiments, a system for subscription porting is presented. The system may include a subscription management computer system. The subscription management computer system may be configured to receive, from a first subscriber, a temporary subscription port request. The temporary subscription port request may include an identifier of a visitor television receiver and authentication information for the first subscriber. The subscription management computer system may be configured to, in response to the temporary subscription port request, transmit a first command to a home television receiver that disables viewing a first set of television channels linked with a first subscription account, which is linked with the first subscriber. The subscription management computer system may be configured to, in response to the temporary subscription port request, transmit a second command to the visitor television receiver that enables viewing the first set of television channels linked with the first subscription account. The home television receiver of the system may be configured to permit access to television channels based on received instructions. The visitor television receiver of the system may be configured to permit access to television channels based on received instructions.

Embodiments of such a computer system may include one or more of the following features: The visitor television receiver may be further configured to, in response to user input, display information that identifies the visitor television receiver. The subscription management computer system may be further configured to receive the temporary subscription port request from a mobile device of the first subscriber. The information that identifies the visitor television receiver may be a graphical image. The temporary subscription port request may comprise a captured image of the graphical image. The temporary subscription port request may include an indication of a location of the mobile device. The subscription management computer system may be further configured to compare the location of the mobile device with a stored address linked with the visitor television receiver. The home television receiver may be configured to record television programming based on one or more timers while viewing of the first set of television channels of the first subscription account is disabled. The recorded television programming may be inaccessible while viewing of the first set of television channels of the first subscription account is disabled. The second command may authorize viewing of the first set of television channels for a predefined period of time.

Additionally or alternatively, embodiments of such a computer system may include one or more of the following features: The home television receiver may be configured to transmit, via a network, a confirmation to the subscription management computer system that indicates viewing of the first set of television channels has been disabled in response to the first command. The subscription management computer system may be further configured to transmit, the second command to the visitor television receiver that enables viewing of the first set of television channels after receiving the confirmation from the home television receiver. The visitor television receiver may be configured to send the identifier of the visitor television receiver via a local wireless network to a mobile device of the first subscriber. The subscription management computer system may be further configured to receive the temporary subscription port request from the mobile device of the first subscriber. The system may include a remote control that is configured to store a set of user preferences that were set by the first subscriber at the home television receiver. The remote control may be further configured to transmit the set of user preferences to the visitor television receiver while the remote control is used with the visitor television receiver.

In some embodiments, a method for subscription porting may be presented. The method may include receiving, by a subscription management computer system, from a first subscriber, a temporary subscription port request. The temporary subscription port request may include an identifier of a visitor television receiver and authentication information for the first subscriber. The method may include in response to the temporary subscription port request, transmit, by the subscription management computer system, a first command to a home television receiver that disables viewing a first set of television channels linked with a first subscription account, which is linked with the first subscriber. The method may include, in response to the temporary subscription port request, transmit, by the subscription management computer system, a second command to the visitor television receiver that enables viewing the first set of television channels linked with the first subscription account. The method may include, in response to user input, causing, by the visitor television receiver, information to be displayed that identifies the visitor television receiver. The method may include receiving, by the subscription management computer system, the temporary subscription port request from a mobile device of the first subscriber. The information that identifies the visitor television receiver may be a graphical image. The temporary subscription port request may include a captured image of the graphical image. The temporary subscription port request may include an indication of a location of the mobile device. The method may include comparing, by the subscription management computer system, the location of the mobile device with a stored address linked with the visitor television receiver. The method may include recording, by the home television receiver, television programming based on one or more timers while output for viewing of the first set of television channels of the first subscription account is disabled. The method may include blocking, by the home television receiver, output of the recorded television programming while viewing of the first set of television channels of the first subscription account is disabled. The method may include transmitting, by the home television receiver via a network, a confirmation to the subscription management computer system that indicates viewing of the first set of television channels has been disabled in response to the first command. The subscription management computer system may be further configured to transmit, the second command to the visitor television receiver that enables viewing of the first set of television channels after receiving the confirmation from the home television receiver.

In some embodiments, a non-transitory processor-readable medium for subscription porting is presented. The non-transitory processor-readable medium may include processor-readable instructions configured to cause one or more processors to receive, from a first subscriber, a temporary subscription port request. The temporary subscription port request may include an identifier of a visitor television receiver and authentication information for the first subscriber. The instructions may be configured to cause the one or more processors to, in response to the temporary subscription port request, transmit a first command to a home television receiver that disables viewing a first set of television channels linked with a first subscription account, which is linked with the first subscriber. The instructions may be configured to cause the one or more processors to, in response to the temporary subscription port request, transmit a second command to the visitor television receiver that enables viewing the first set of television channels linked with the first subscription account.

Embodiments of such a non-transitory processor-readable medium may include one or more of the following features: The identifier of the visitor television receiver is a graphical image. The temporary subscription port request may include a captured image of the graphical image. The temporary subscription port request may include an indication of a location of the mobile device. The instructions may be configured to cause the one or more processors to compare the location of the mobile device with a stored address linked with the visitor television receiver.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
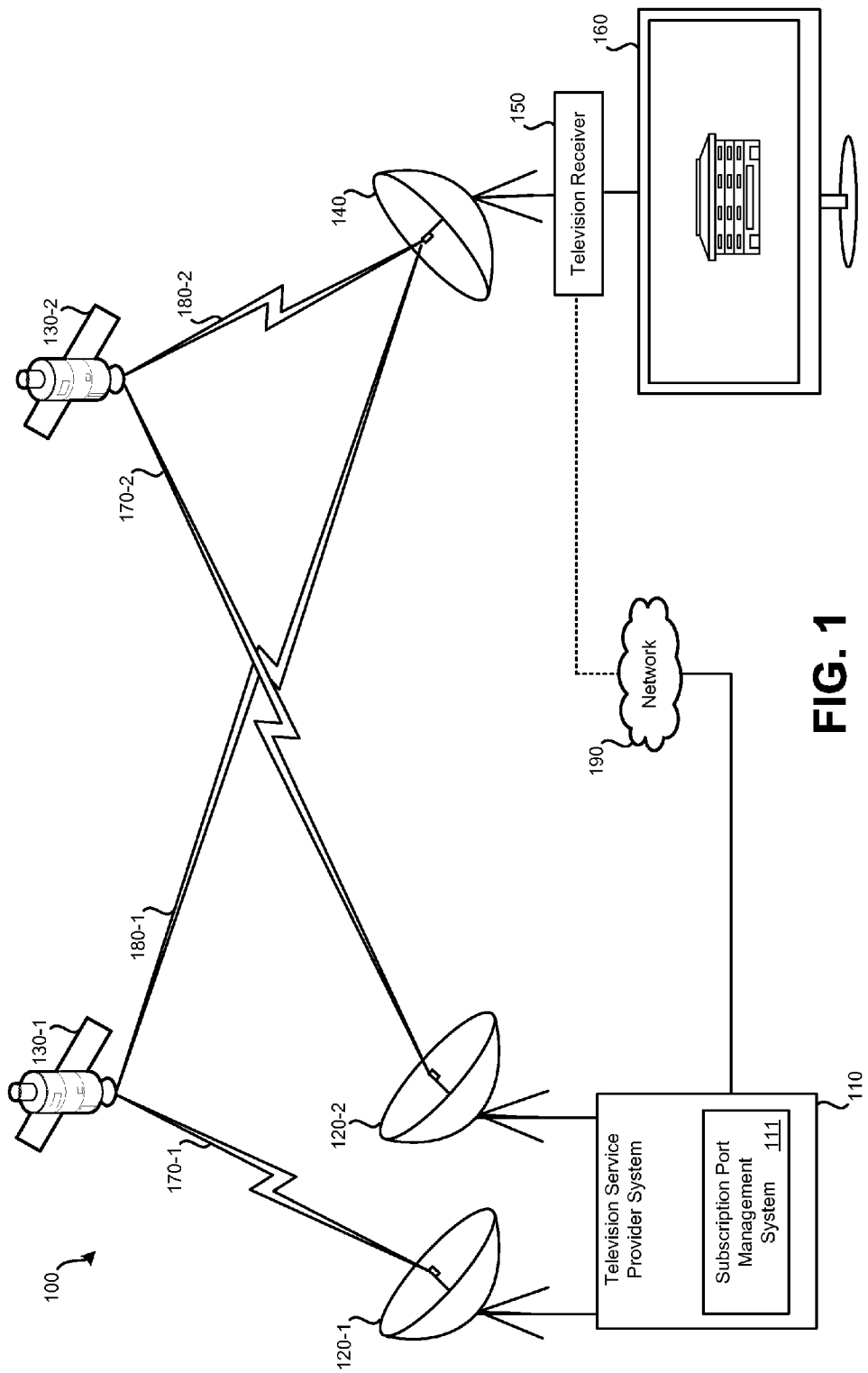
FIG. 1 illustrates an embodiment of a satellite-based television distribution system.

Typically, a particular television subscription package is tied to a particular set of one or more television receivers, located at a particular location. For instance, a subscriber may have four television receivers located in his home (the subscriber's home television receivers) through which he is permitted access to a particular set of television channels. If the subscriber visits a friend across town having the same television service provider but a less extensive subscription, the subscriber may be stuck with only watching the television channels available through his friend's subscription and television receiver (the visitor television receiver). This is unfortunate, particularly if there is a television program that is not available under the friend's subscription that the subscriber would like to view while at his friend's home.

In embodiments detailed herein, a subscriber may be permitted to temporarily move his subscription package to another set of one or more visitor television receivers, referred to as a "subscription port." To do this, access to viewing of the television channels may be blocked at the subscriber's home television receiver while the subscription is activated at a visitor television receiver. Returning to the previous example, while at the friend's house, the subscriber may be able to view any television channel available as part of the subscriber's subscription package via the visitor television receiver. During the time the subscription is ported to the visitor television receiver, the one or more home television receivers at the subscriber's home location may be blocked from being used to output television channels for viewing under the subscriber's subscription. As such, at any given time, the subscriber's subscription may only be used to view television at one location.

In some types of television distribution systems, the above arrangement may be complicated by the communication pathways between a television service provider and subscribers' television receivers. For instance, in at least some satellite television distribution systems, a unidirectional link is present between television distribution satellites and television receivers. Therefore, for a television receiver to transmit information to the television service provider, an alternate communicate path would be necessary. In some embodiments detailed herein, a subscriber's mobile device (e.g., cellular phone, tablet computer, personal digital assistant, computer, or other form of network-enabled computerized device) is used to capture an identifier of the visitor television receiver. The identifier may be displayed via a display device (e.g., television) and may be entered into the mobile device by the subscriber (or some other person). Alternatively, a displayed graphic (e.g., a QR code) may be captured by the mobile device, possibly decoded, and transmitted to the television service provider. The identifier is transferred, via the Internet, to the television service provider. In some embodiments, the location of the mobile device is verified to be within a predefined distance of the visitor television receiver. Via satellite, the television service provider can suspend access at the subscriber's home television receiver and enable access to the subscriber's subscription package at the visitor television receiver. This may be performed for a set period of time, such as one day, or until the subscriber provides another indication, such as via the mobile device, that temporary use of the subscription at the visitor television receiver should be ended.

While a subscriber may wish to watch programming via the visitor television receiver, the subscriber may desire for various timers at the subscriber's home television receiver to still result in television programming being recorded. As such, while live television programming may not be viewed while the subscription port is active, live television programming may still be permitted to be recorded by the home television receiver. Viewing of such recorded television programming may be blocked until the subscription port is ended. Further detail is provided in relation to the figures detailed below.

For the purposes of this document, the term "home television receiver" refers to the television receiver located at a subscriber's normal, home location. For instance, a subscriber's home television receiver may likely be located at his residence. A "visitor television receiver" refers to the television receiver at a location where the subscriber is visiting, such as a hotel, friend's residence, family residence, vacation home, etc. While embodiments detailed herein refer to a single home television receiver and a single visitor television receiver, it should be understood that at a subscriber's home location, multiple television receivers may be present. Similarly, multiple television receivers may be present at a visitor location. The embodiments detailed herein can be applied to such situations involving multiple home and/or multiple visitor television receivers. For example, if access is disabled at a home television receiver, this may also be interpreted as access being disabled at multiple home television receivers at the home location.

Figure 3A:
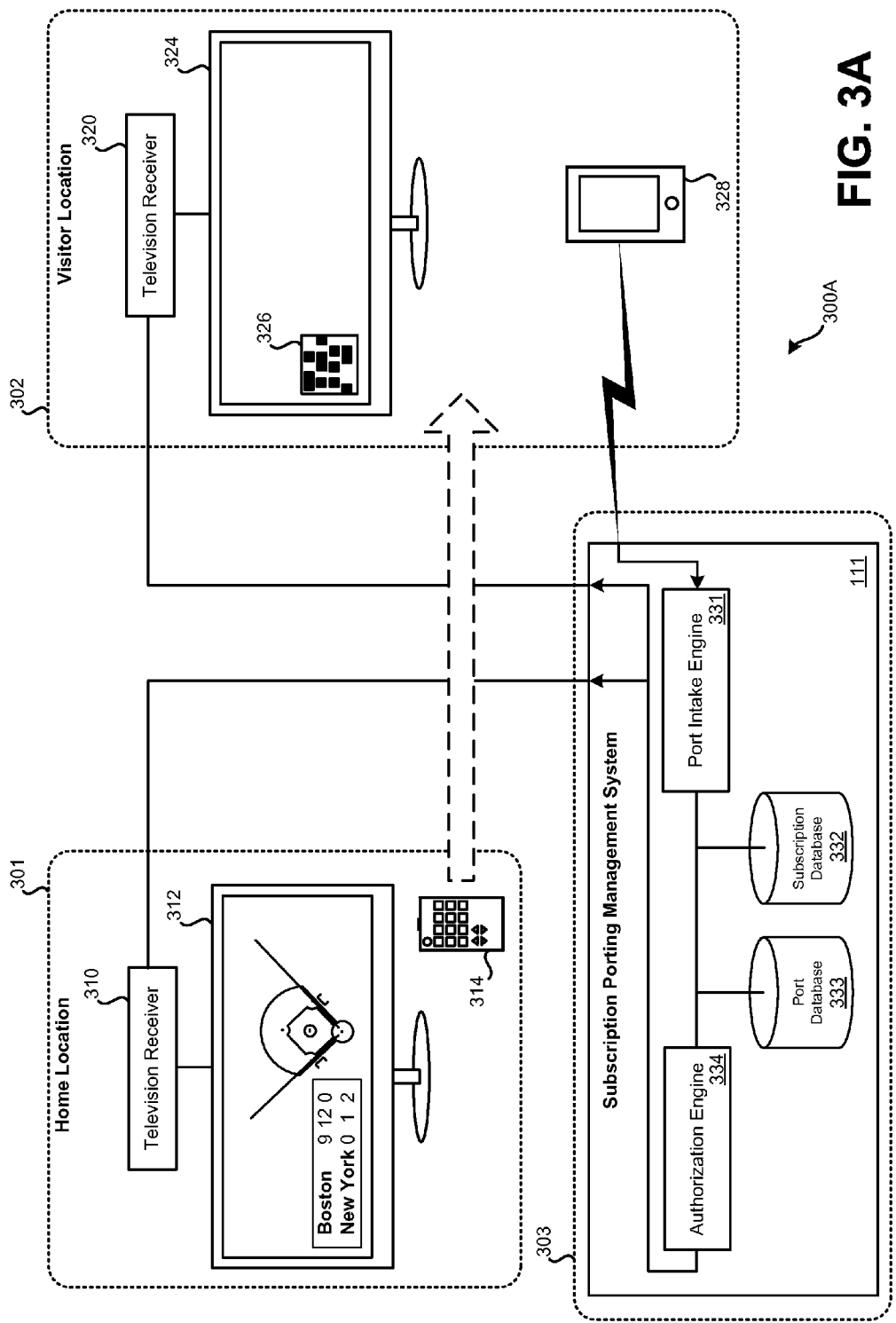
FIG. 3A illustrates an embodiment of a subscription porting management system (SPMS) controlling access rights at multiple television receivers.
Figure 3B:
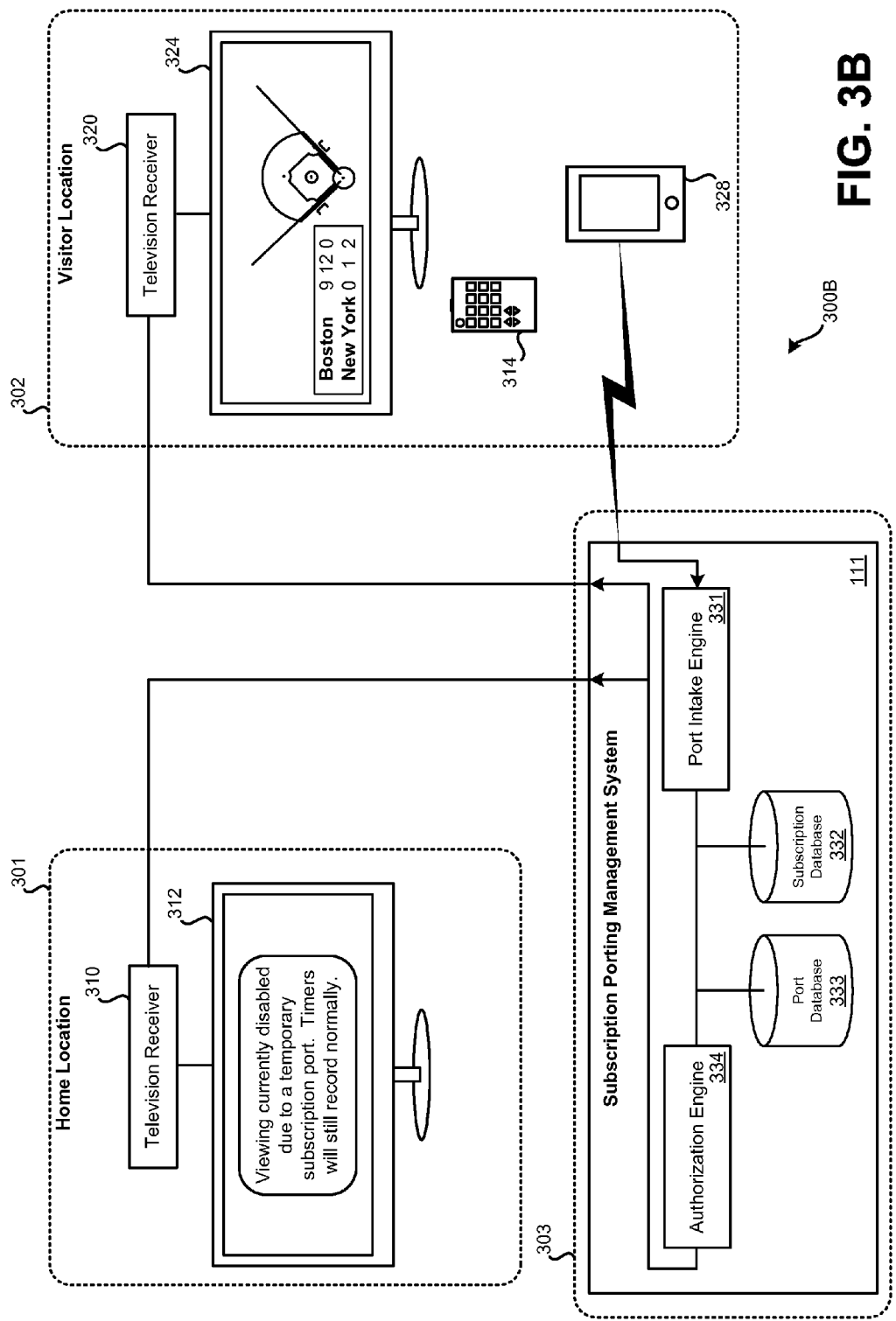
FIG. 3B illustrates another embodiment of a SPMS controlling access rights at multiple television receivers.

FIG. 1 illustrates an embodiment of a satellite television distribution system 100 that is configured to permit a subscriber's subscription package of television channels to be temporarily used at a visitor television receiver at another location. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130. For instance, FIGS. 3A and 3B illustrate user equipment at a home location and at a visitor location.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
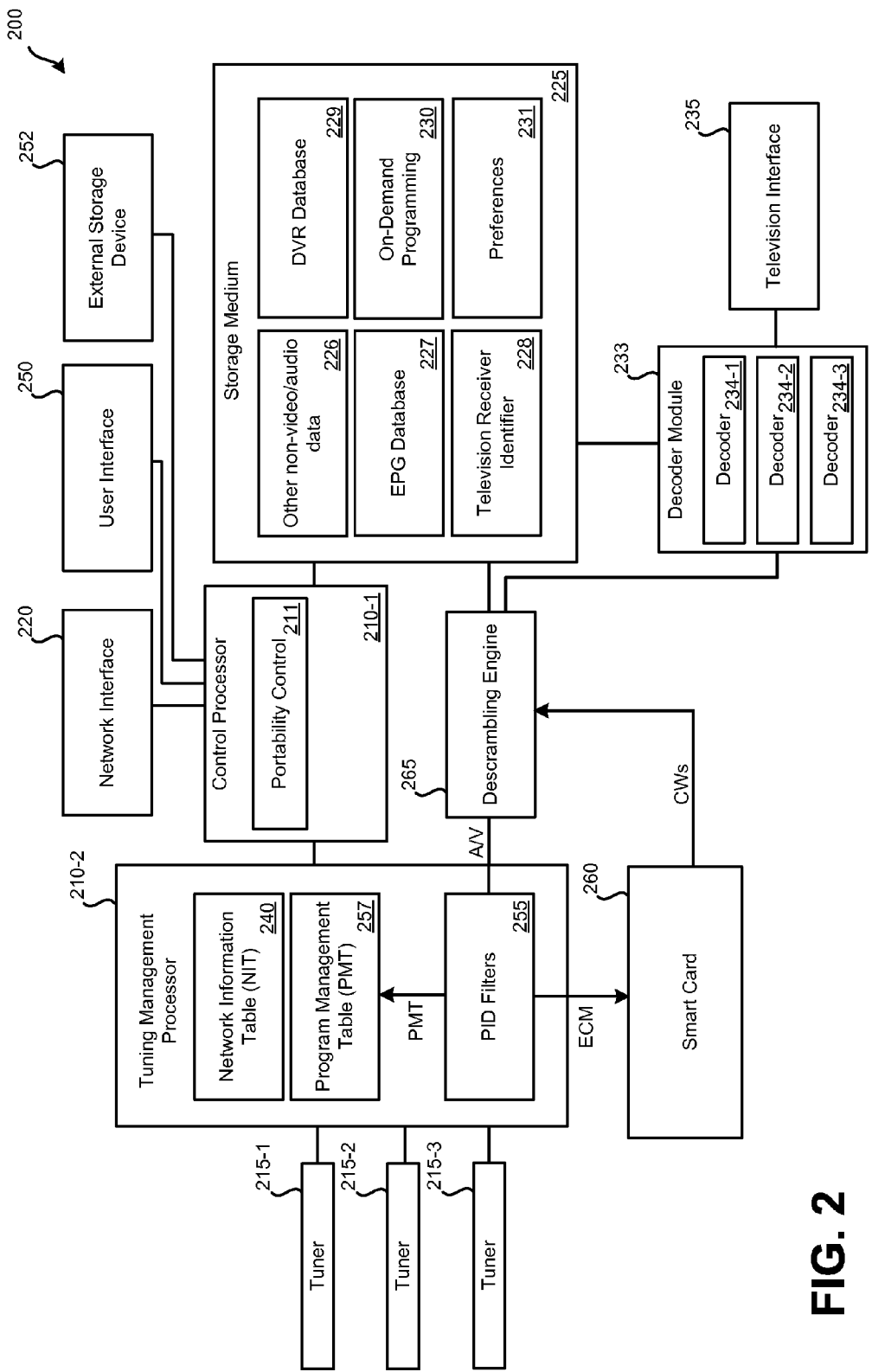
FIG. 2 illustrates an embodiment of a television receiver.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

Some or all of satellites 130 may be configured to transmit spot beams. A spot beam may allow a satellite to transmit a transponder stream to a particular geographic region (e.g., to distribute local television channels to the relevant television market). A spot beam is directed to a smaller geographic region than a non-spot beam. For instance, a first transponder that is a spot beam may be directed to provide a transponder stream to the greater-Boston area, while a non-spot beam may be directed to provide another transponder stream to the contiguous forty-eight states. An advantage of a spot beam is that the same frequency may be reused for different geographic areas. For instance, a spot beam at a first frequency directed to the east coast of the United States may be reused to carry different television channels at the same frequency to the west coast. A multiregional signal or multiregional television channel may refer to a signal/television channel that is broadcast to be received in multiple television markets, for instance throughout the eastern time zone of the United States. A regional signal or regional television channel may refer to a spot beam that is targeted to a specific television market. In many instances, spot beams are used to transmit local television channels to a particular television market.

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

Television service provider system 110 may include a subscription port management system 111 (SPMS). SPMS 111 may be configured to allow a subscriber to temporarily use his subscription at a television receiver other than the subscriber's television receiver associated with his subscription. For example, if the subscriber's subscription is linked with television receiver 150, SPMS 111 may permit the subscriber to access and view the channels associated with the subscriber's subscription at another television receiver (e.g., a television receiver linked with some other subscriber's subscription). SPMS 111 may at least partially disable the subscriber's television receiver while the subscription is being used at another television receiver. Recording of television programs may still be permitted, but viewing of live or recorded television programming may not be permitted.

FIG. 2 illustrates an embodiment of television receiver 200. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 227, television interface 235, networking information table (NIT) 240, digital video recorder (DVR) database 229 (which may include provider-managed television programming storage and/or user-defined television programming), on-demand programming 230, television receiver identifier 228, preferences 231, user interface 250, external storage device 252, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program management table 257.

Processors 210 may include one or more specialized and/or general-purpose processors configured to perform processes such as tuning to a particular channel, accessing and displaying EPG information from EPG database 227, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 229. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may contain a portability control 211. Portability control 211 may be configured to manage the portability of a subscriber's subscription account. Portability control 211, upon receiving input from a user, may be configured to output an identifier (stored as television receiver identifier 228) of television receiver 200. This identifier may uniquely identify television receiver 200 (or, more specifically, smart card 260) from among other television receivers/smart cards associated with the television service provider. Portability control 211 may output the identifier by causing display of an address (in the form of text) via a display device, such as a television. Portability control 211 may output the identifier by causing a graphical element to be displayed via the display device. The graphical element may be a representation of the identifier. For instance a bar code, QR code, or some other form of graphical element may be used to present the identifier. Therefore, in some embodiments, television receiver identifier 228 is a graphical element. In some embodiments, portability control 211 may output the identifier by a wireless transfer to another device, such as a mobile device. For instance, network interface 220 may include a local wireless interface which can be used to communicate with other wireless devices in the vicinity. The identifier may be used to identify television receiver 200 to temporarily enable or disable permissions associated with a subscription.

Portability control 211 may be further configured to control permissions based on data received from a television service provider. For instance, instructions addressed specifically to television receiver 200 (e.g., based on an identifier stored on smart card 260) may indicate whether particular television channels should be enabled or disabled for viewing and/or recording due to a subscription port. The instructions may be received via satellite and via one or more of tuners 215. Therefore, when additional television channels are being made available via television receiver 200, instructions may be received that enable decoding and output (but possibly not recording) of the additional television channels; when a subscription usually used at television receiver 200 is being temporarily used at another television receiver, instructions may be received that disable output of at least some television channels (recording may still be permitted).

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability) from a television service provider may also be received via network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 227, other non-video/audio data 226, DVR database 229, television receiver identifier 228, preferences 231, and/or on-demand programming 230. Recorded television programs may be stored using storage medium 225 as part of DVR database 229. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 227 may store information related to television channels and the timing of programs appearing on such television channels. EPG database 227 may be stored using storage medium 225, which may be a hard drive. Information from EPG database 227 may be used to inform users of what television channels or programs are popular and/or provide recommendations to the user. Information from EPG database 227 may provide the user with a visual interface displayed by a television that allows a user to browse and select television channels and/or television programs for viewing and/or recording. Information used to populate EPG database 227 may be received via network interface 220 and/or via satellites, such as satellites 130 of FIG. 1 via tuners 215. For instance, updates to EPG database 227 may be received periodically via satellite. EPG database 227 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 227 and other non-video/audio data 226. This "other" data may permit television receiver 200 to function properly. In some embodiments, at least ten gigabytes are allocated to such other data. For example, if NIT 240 is stored by storage medium 225, it may be part of other non-video/audio data 226.

Preferences 231 may include settings and favorites defined by a subscriber. For instance, the subscriber's favorite channels, display configuration settings, and other types of preferences may be stored to storage medium 225. Television receiver identifier 228 may be string of characters that uniquely identifies television receiver 200 (or smart card 260) from other television receivers/smart cards in communication with the television service provider. Television receiver identifier 228 may be represented as a graphic (e.g., a QR code) that can be output for display via television interface 235.

Decoder module 233 may serve to convert encoded video and audio into a format suitable for output to a display device. For instance, Decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200.

Television interface 235 may serve to output a signal to a television (or another form of display device) in a proper format for display of video and playback of audio. As such, television interface 235 may output one or more television channels, stored television programming from storage medium 225 (e.g., television programs from DVR database 229, television programs from on-demand programming 230 and/or information from EPG database 227) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 229 may store information related to the recording of television channels. DVR database 229 may store timers that are used by control processor 210-1 to determine when a television channel should be tuned to and its programs recorded to DVR database 229 of storage medium 225. In some embodiments, a limited amount of storage medium 225 may be devoted to DVR database 229. Timers may be set by the television service provider and/or one or more users of television receiver 200.

DVR database 229 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming 230 may represent additional television programming stored by storage medium 225. On-demand programming 230 may include television programming that was not recorded to storage medium 225 via a timer (either user- or provider-defined). Rather, on-demand programming is programming provided to the television receiver directly for storage by the television receiver and for later presentation to one or more users. On-demand programming 230 may not be user-selected. As such, the television programming stored to on-demand programming storage 230 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 227, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences. Further, by storing preferences 231 to a remote control, the remote control can be brought to a second television receiver and used to apply preferences 231 to the second television receiver. For instance, if a subscriber is temporarily using his subscription at another television receiver, by bringing his remote control, the subscriber's preferences 231 from his home television receiver can be applied to the visitor television receiver.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

In order to be able to decrypt an ECM, smart card 260 may need to receive an entitlement management message (EMM) that authorizes smart card 260 to decrypt the ECMs associated with a particular channel. An EMM may be received via a tuner of tuners 215 or could be transmitted to the television receiver via an alternate communication path, such as via the Internet. The EMM may indicate specific programming authorizations for the television receiver in which smart card 260 is present. Further, an EMM contains an identifier associated with the specific smart card 260, which may be referred to as a serial number or address. EMMs may be used by a television service provide to grant and deny access of the television receiver containing smart card 260 to specific television channels. For instance, without having received an EMM granting specific programming authorizations to a television channel, smart card 260 may be unable to decrypt ECMs for the television channel. Various times at which one or more EMMs may be sent to a television receiver include: when a smart card is being activated for a new subscription, a user has changed the television channels accessible in his subscription, and, as detailed herein, when a user temporarily desires his subscription to be accessible at another television receiver. Rather than solely blocking or allowing access to television channels, it may be possible to use EMMs to block output of a television channel by a television receiver, but permit the television channel to be recorded.

It should be understood that while the description detailed herein is performed by a smart card, such decryption and interpretation of ECMs and EMMs (or similar data) may be performed by some other form of security device, which may, for instance, be permanently part of the television receiver. Further, in some embodiments, the smart card may be present in the television receiver that cannot be removed by a user.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2. Similar to a PID filter being created for a particular television channel, a PID filter may be created for timing signals for use in determining the location of the television receiver.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television.

FIG. 3A illustrates an embodiment 300A of a subscription port management system (SPMS) controlling access rights at multiple television receivers. SPMS 111 of FIG. 3A may represent SPMS 111 of FIG. 1. Television receiver 310 and television receiver 320 may represent instances of television receiver 150 of FIG. 1 and/or television receiver 200 of FIG. 2. In embodiment 300A, a home location 301 and a visitor location 302 is present. Home location 301 indicates a subscriber's address where the subscriber's television service subscription is, by default, used for access to television services. For instance, home location 301 may be the subscriber's home or the subscriber's place of business (e.g., a bar, a restaurant). Visitor location 302 may represent a place where the subscriber is visiting and desires to temporarily use his subscription with the television service provider. Visitor location 302 may already be configured to receive television channels from the same television service provider. For instance, visitor location 302 may represent someone else's home, at which a second subscriber lives that has a different (likely more restrictive) subscription with the same television service provider. Visitor location 302 can represent a different geographic location than home location 301. For instance, visitor location 302 may be a different house, in a different neighborhood, on a different street, in a different city, in a different state, or even possibly in a different country, than home location 301. Referring to FIG. 1, a different satellite dish 140 would be used at visitor location 302 than at home location 301. SPMS 111, which may be part of a television service provider system, is located at a third location 303, which is different from home location 301 and visitor location 302.

At home location 301, television receiver 310 and display device 312 are present. Typically, a subscriber's subscription may be used for viewing and recording a set of television channels via television receiver 310. The address of home location 301 may be stored by the television service provider, such as in subscription database 332 of SPMS 111. At visitor location 302, television receiver 320 and display device 324 is present. At visitor location 302, typically, a subscription may be active for viewing and recording a set of television channels via television receiver 320. For embodiment 300A, it can be assumed that the subscription typically associated with home location 301 includes a larger set of television channels and/or a different set of television channels than the subscription associated with visitor location 302 (which may be a reason why the subscriber visiting visitor location 302 from home location 301 desires to temporarily use his subscription at visitor location 302).

SPMS 111 may contain multiple components, including: port intake engine 331, subscription database 332, port database 333, and authorization engine 334. A subscriber, associated with home location 301, may be visiting visitor location 302. Via mobile device 328 (which may be a cellular phone, tablet computer, laptop, or some other form of computerized device) the subscriber may initiate a subscription port. Mobile device 328 may be configured to communicate wireless with a network, such as the Internet, that allows for communication with SPMS 111. Such communication is illustrated by a wireless link. To initiate the subscription port, the subscriber may activate a particular application on mobile device 328, such as an application associated with the television service provider. In some embodiments, the subscriber may navigate to a website that enables subscription porting via mobile device 328. To initiate the subscription port, the subscriber may provide authentication information to mobile device 328, such as a username and password. An identifier of the television receiver 320 at visitor location 302 may also be provided. In illustrated embodiment 300A, the subscriber has provided input to television receiver 320 instructing television receiver 320 to output for display a graphical indication that identifies television receiver 320. A camera of mobile device 328 may be used to capture an image of graphical representation 326, which may be a QR code or some other form of graphical identifier of television receiver 320. In some embodiments, a string of characters may be presented via display device 324 by television receiver 320 that identifies television receiver 320. Such a string of characters may be entered by the subscriber into mobile device 328 (such as via a keypad or touch screen). In other embodiments, the string of characters may be captured via a camera of mobile device 328. In further embodiments, an identifier of television receiver 320 may be wirelessly transmitted to mobile device 328, such as via Bluetooth® or some other wireless transfer protocol. By using such a wireless protocol, it may be confirmed that mobile device 328 of the subscriber is actually in the immediate vicinity of television receiver 320. Further, using a location determination system, such as GPS, a location of mobile device 328 may be captured. In some embodiments, the subscriber, via mobile device 328, may also provide an indication of how long the subscriber would like subscription to be ported to television receiver 320 at visitor location 302.

Of note, the subscription port request is transmitted by mobile device 328 to SPMS 111 via a network, such as a cellular service provider network or a wireless local area network connected with the Internet. Communication to television receiver 320 (and, possibly, television receiver 310) may only be available via a unidirectional satellite-based arrangement. Therefore, a subscription port may be possible even if television receiver 320 and/or television receiver 310 does not have a bidirectional communication path with SPMS 111. However, in other embodiments, it may be possible for a subscription port request to be submitted via television receiver 320 if television receiver 320 is connected with a network (e.g., the Internet) through with SPMS 111 is available.

The authentication information, the identifier of television receiver 320, and/or the location of mobile device 328 may be transferred to SPMS 111. Port intake engine 331 may receive such information and may analyze such information to determine if the subscription port request is legitimate and eligible to be performed. Port intake engine 331, by consulting subscription database 332, may verify whether the subscriber's submitted authentication information is valid. Port intake engine 331 may also consult subscription database 332 to determine if the subscriber's subscription associated with home location 301 is eligible to be temporarily ported to visitor location 302. For instance, restrictions on the subscriber's subscription may limit the frequency and/or locations to which the subscriber's subscription can be temporarily ported. In some embodiments, the rights to perform a subscription port may be an add-on feature for a subscription, or may only be permitted a certain number of times per billing cycle (e.g., once per month). Port intake engine 331 may also consult port database 333 to determine if the subscriber's subscription is currently being ported to some other location, which may invalidate the ability to perform a subscription port to visitor location 302. Alternatively, the previous port may be canceled to permit the subscription port to visitor location 302. Port intake engine 331 may also analyze the identifier of television receiver 320 received from mobile device 328, which may be a graphical representation. Port intake engine 331 may convert graphical representation 326 to a string of characters representing the identifier of television receiver 320. Alternatively, such analysis may be performed by mobile device 328.

Port intake engine 331 may look up the identifier of television receiver 320 in subscription database 332 to determine if television receiver 320 is eligible to receive the subscription port. Also, an address of visitor location 302 may be looked up in subscription database 332 for comparison with the location of mobile device 328. For example, to limit fraud, it may be useful to determine if mobile device 328 is within a predefined threshold distance (e.g., a quarter mile, to allow for error) of the address associated with visitor location 302 as indicated in subscription database 332. If not within the predefined threshold distance, the subscription port may be denied.

If the subscription port is authorized by port intake engine 331, authorization engine 334 may serve to temporarily port the subscribers subscription from use at television receiver 310 to television receiver 320. To do this, authorization engine 334 may look up an identifier associated with television receiver 310 in subscription database 332. A message containing instructions, such as an ECM, addressed to television receiver 310, may be transmitted by authorization engine 334 to television receiver 310 that indicates output for viewing and/or recording of the television channels associated with the subscriber subscription is to be disabled at television receiver 310. Referring to FIG. 1, the message may be transmitted by the television service provider system 110 to the television receiver at the home location via one or more satellites 130 as part of one or more transponder streams that are received by the television receiver via the tuner. Authorization engine 334 may also transmit an addressed message containing instructions to television receiver 320 that indicates output for viewing and/or recording of the television channels associated with the subscriber subscription is to be enabled at television receiver 320. This message may enable viewing and/or recording of the television channels associated with the subscriber subscription for a predefined period of time, such as twenty-four hours. In some embodiments, rather than enabling viewing of the television channels associated with the subscriber subscription for a predefined period of time, viewing and/or recording may be enabled at television receiver 320 until another message is received that disables the subscription port. Authorization engine 334 may store an indication of the subscription port to port database 333. This indication may note when the subscription port is scheduled to end. In some embodiments, when the subscription port is scheduled to end, additional messages containing instructions are transmitted to television receiver 310 and television receiver 320 to revert the subscription port such that the subscriber subscription is available via television receiver 310.

In some embodiments, the subscriber may use remote control 314 at home location 301 to provide input to television receiver 310. Television receiver 310 and remote control 314 may be configured such that preferences set by the subscriber at television receiver 310 may be stored to remote control 314. The subscriber, by bringing remote control 314 from home location 301 to visitor location 302, may apply the subscriber's preferences to television receiver 320. The dotted arrow represents remote control 314 being moved from home location 301 to visitor location 302. Further detail regarding how such a remote control may be used to receive, store, and transmit data is provided in U.S. Pat. No. 8,341,686, entitled, "Backup and Restore of Network Configuration Data using a Remote Controller Device," which is hereby incorporated by reference. The subscriber may provide input to remote control 314 that indicates preferences stored on remote control 314 are to be applied to television receiver 320. For at least the duration of the subscription port, the preferences transmitted from remote control 314 to television receiver 320 may be used to configure television receiver 320. In some embodiments, when the subscription port is no longer active at television receiver 320, the preferences transmitted from remote control 314 to television receiver 320 may be reverted to preferences previously set at television receiver 320. In some embodiments, rather than using remote control 314 to apply preferences from television receiver 310 to television receiver 320, the preferences may be transmitted to television receiver 320 by mobile device 328. In still other embodiments, such preferences may be received by SPMS 111 via a network connection with television receiver 310 and transmitted to television receiver 320 via such a network connection or via satellite.

SPMS 111 of FIG. 3A is illustrated as having various databases and components, which may be implemented using software, hardware, and/or firmware. It should be understood that the functionality disclosed related to these components may be combined into fewer components or divided out and performed by a greater number of components. For example, port database 333 and subscription database 332 may be combined into a single database.

FIG. 3B illustrates another embodiment 300B of a SPMS controlling access rights at multiple television receivers. Embodiment 300B may represent embodiment 300A of FIG. 3A while a subscription port to visitor location 302 is in place. In embodiment 300B, a temporary subscription port has been performed such that the subscriber subscription is available for use at visitor location 302, while use of the subscription is at least partially suspended at home location 301.

While the subscription port may enable viewing of television channels available through the subscriber's subscription at visitor location 302 via a television receiver 320, recording of such television channels may not be permitted at television receiver 320. In some embodiments, recording, via DVR functionality of television receiver 320, may be permitted; however, the recordings may only be available during the subscription port if the television channel recorded is available through the subscriber's subscription, but not the subscription enabled at television receiver 320 after the temporary subscription port is reverted. If the television channel recorded during the subscription port is available during the subscription enabled after the subscription port is over, the recording of the television channel may be available for use after the subscription port. In some embodiments, despite a subscription port being in progress, timers set to record television programming at television receiver 320 before the subscription port was performed may still be performed regardless of the subscription port.

Referring to television receiver 310, while the subscription port is in progress, viewing of television programs may be prohibited at home location 301. If a person attempts to use television receiver 310 to view television programming, a message may be displayed via a display device 312 that indicates that a temporary subscription port is currently in progress and viewing television programming is blocked. In some embodiments, television receiver 310 may be prohibited from outputting live television during subscription port. However, television receiver 310 may be permitted to output stored television programming that was recorded prior to the temporary subscription port being enabled. Further, in some embodiments, television receiver 310 may continue to enforce previously set timers to record television programming using DVR functionality of television receiver 310. Such recorded programming may not be available for viewing via television receiver 310 until the temporary subscription port is reverted such that the subscriber subscription returns to being available at home location 301. For example, if a subscriber has a timer at television receiver 310 set to record a particular television program from 7:00-7:30 PM every Thursday, the subscriber setting a temporary subscription port to visitor location 302 for a Thursday may not prevent television receiver 310 from recording according to the timer, despite viewing of television programming via television receiver 310 being blocked on that day.

Once the predefined or set period of time of the temporary subscription port is over (and, possibly, messaging containing such instructions is transmitted to the television receivers), the subscriber's subscription may return to being available via television receiver 310 at home location 301. Television receiver 320 at visitor location 302 may revert to the subscription previously associated with television receiver 320, as indicated in subscription database 332. In some embodiments, the reversion may not occur until the subscriber provides input via mobile device 328 to indicate that the subscription port is to be ended. For instance, the subscriber may not desire to end the subscription port until he returns to home location 301.

Figure 4A:
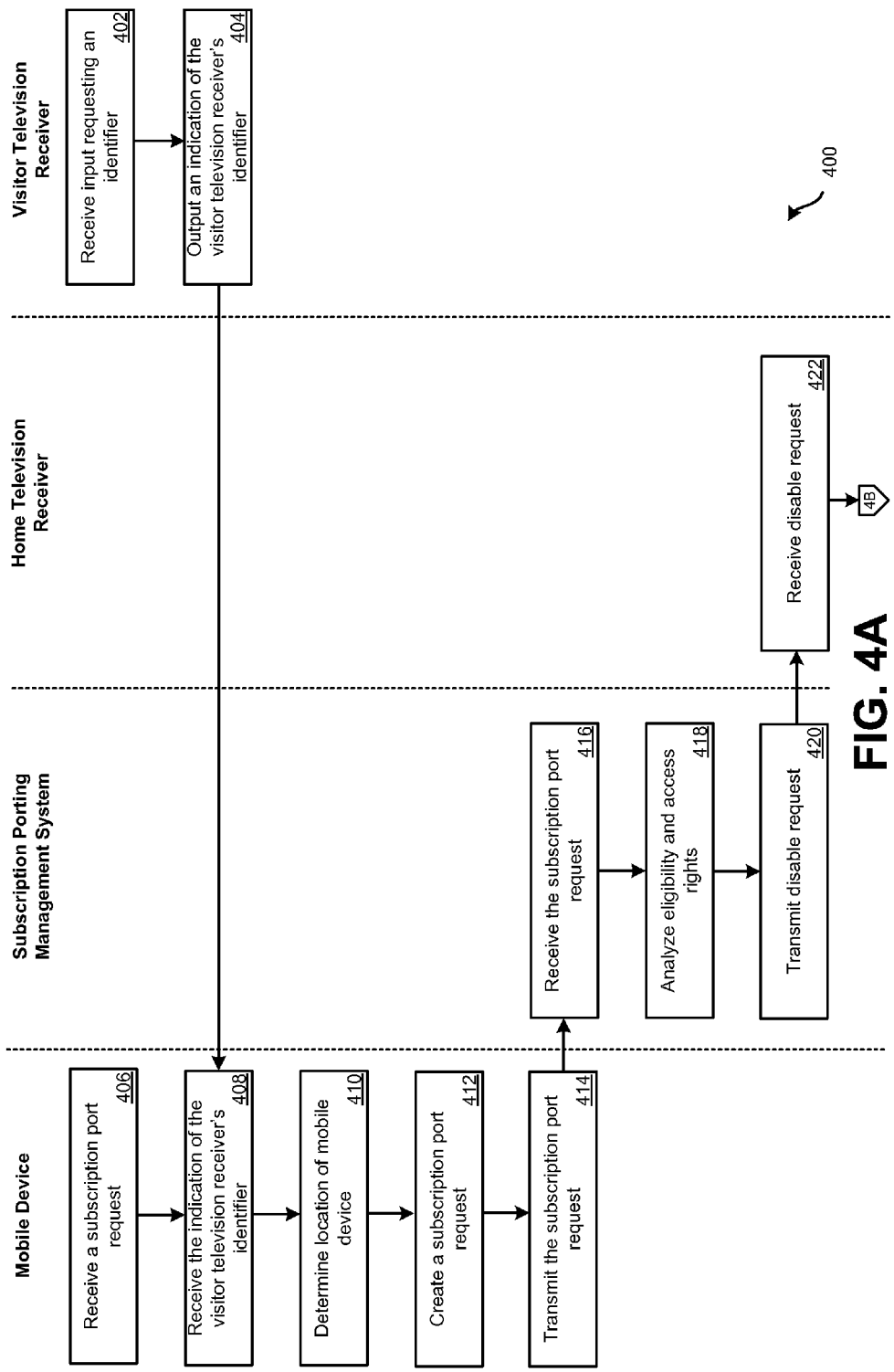
FIGS. 4A and 4B illustrate a swim diagram of a method for subscription porting.
Figure 4B:
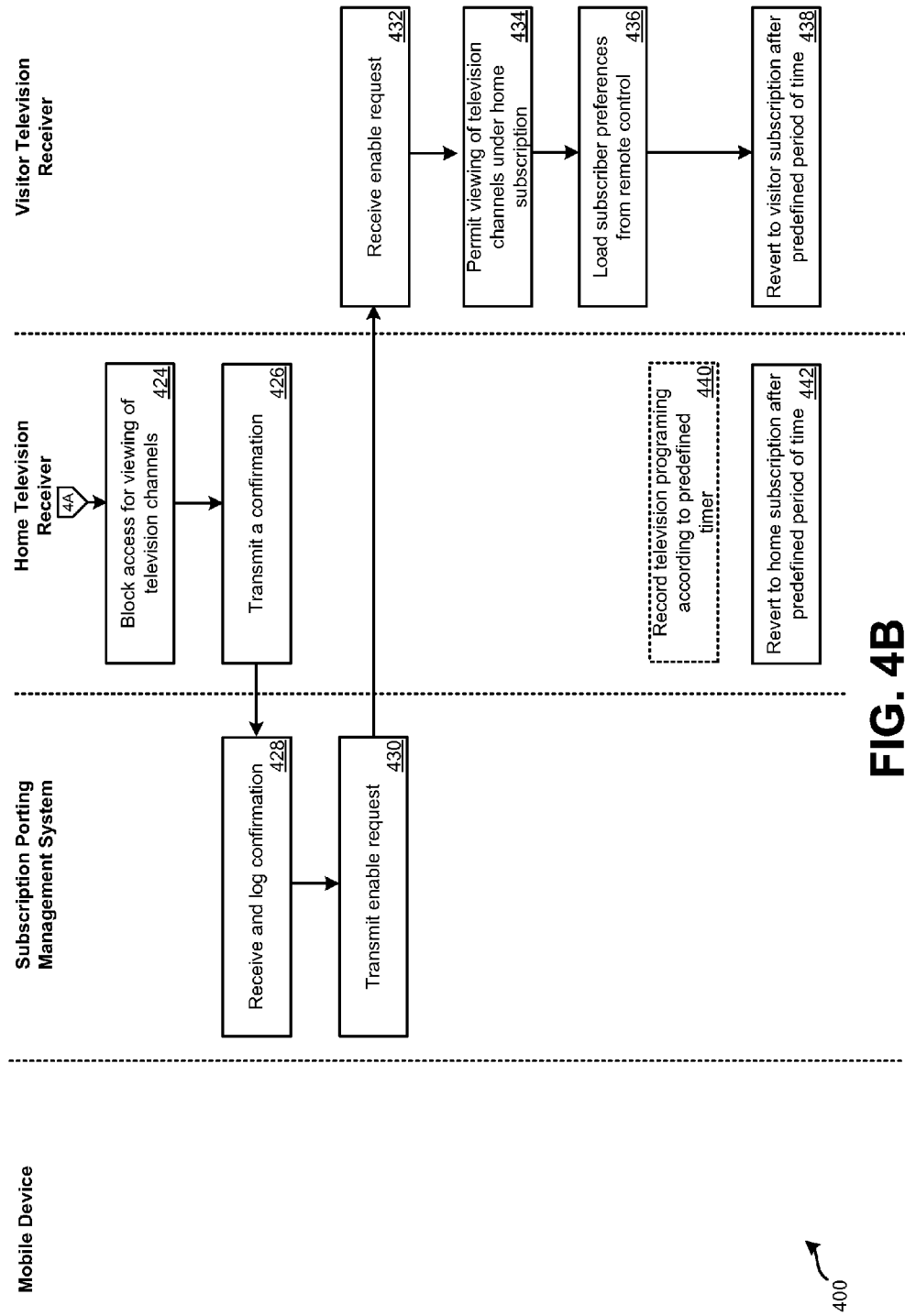

FIGS. 4A and 4B illustrate a swim diagram of a method 400 for subscription porting. Steps of method 400 may be performed by the device indicated in the column in which the step is listed. Steps may be performed by a mobile device, which may be mobile device 328 of FIGS. 3A and 3B, a subscription porting management system, which may be SPMS 111 of FIGS. 1, 3A, and 3B, a home television receiver, which may be television receiver 310 of FIGS. 3A and 3B, and a visitor television receiver, which may be television receiver 320 of FIGS. 3A and 3B. As in FIGS. 3A and 3B, the home television receiver refers to the television receiver where a subscriber's television subscription is by default activated, which may likely be his home. The visitor television receiver is where the subscriber would temporarily desire to active the subscriber's subscription. Means for performing method 400 includes the devices and systems discussed above. Such devices and systems may be computerized to include one or more instances of components from computer system 500 of FIG. 5.

At step 402, input may be provided to the visitor television receiver requesting identification of the visitor television receiver. In response to such input, step 404 may be performed. This may involve the visitor television receiver displaying an identifier (e.g., an address) unique among television receivers of the television service provider. Display of the identifier may be performed via a display device, such as a television. A graphical indication of an identifier of the television receiver may additionally or alternatively be presented. Such a graphical indication of the identifier may be captured using a mobile device, such as using a camera of a cell phone. In other embodiments, the identifier of the visitor television receiver may be wirelessly transmitted to another device, such as mobile device. Such a transfer may occur via a local area wireless communication protocol.

At step 406, a subscriber may provide a mobile device, such as the subscriber's mobile phone, with an indication that a temporary subscription port is desired to be performed. This may involve the subscriber causing an application provided by the television service provider to be executed by the mobile device. In other embodiments, the subscriber may use the mobile device to access a webpage used to configure temporary subscription ports. Additionally, at step 406, authentication information about the subscriber may be received. This may involve the subscriber providing a username and password, which can be used to authenticate the subscriber. At step 408, the identifier of the visitor television receiver may be received. In some embodiments, the identifier is received by a user manually typing in or otherwise inputting the identifier to the mobile device. In some embodiments, a camera of the mobile device may be used to capture a graphical representation of the identifier being presented by display device connected with the visitor television receiver. Such a graphical representation may be analyzed by the mobile device to obtain the identifier or an image of a graphical representation may be transmitted to the SPMS for interpretation. In some embodiments, receiving the identifier may involve receiving a wireless transmission from the visitor television receiver performed using a local area wireless communication protocol. At step 410, the mobile device may determine its location. The location of the mobile device may be determined using GPS, cellular tower triangulation or trilateration, or some other form of location determination.

At step 412, a subscription port request may be created. The subscription port request may indicate the authentication information of the subscriber, the identifier of the visitor television receiver (which may be a captured image of the graphical representation of the visitor television receiver's identifier), and/or the location of the mobile device. At step 414, this subscription port request may be transmitted to the SPMS. The subscription port request may be transmitted via a network connection not available to the visitor television receiver. For instance, a local wireless communication network in communication with the Internet or a cellular service provider's network in communication with the Internet may be used to transmit the request to the SPMS. In other embodiments, rather than using a mobile device to submit the subscription port request, the visitor television receiver, if connected with the Internet, may be used to directly submit the subscription port request to the SPMS.

At step 416, the subscription port request may be received by the SPMS. The subscription port request received at step 416 may be received via the Internet. At step 418, eligibility and access rights for subscription port request may be analyzed by the SPMS. Analyzing the subscription port request may include determining whether the subscriber subscription is eligible for temporary port. The subscriber subscription may also be compared with the subscription currently active at the visitor television receiver. For instance, a temporary port request of a subscription that is associated with television channels already available via the subscription at the visitor television receiver may not be permitted. The subscription port request may also be analyzed to determine if the subscriber subscription is currently being ported to some other television receiver and/or whether the subscription port request is valid based on any previous subscription ports that have previously been performed under the subscriber's account. The subscription port request may also be analyzed based on the geographic location of the subscriber's home television receiver as compared to the visitor television receiver. For example, the television receivers may be required to be located in the same country, state, or other geopolitical region. In some embodiments, the location of the mobile device received as part of the subscription port request at step 416 may be compared to an address on record for the visitor television receiver. If the locations do not match (within a predefined threshold), this may be an indication that some form of fraud is occurring (e.g., the visitor television receivers installed in a location other than the address indicated on the corresponding subscription). The subscriber's subscription may further be analyzed to determine which television channels the subscriber is permitted to temporarily port. For instance, not all television channels may be permitted to be temporarily ported.

Assuming the visitor television receiver and the subscriber subscription are eligible for a temporary subscription port, method 400 may proceed to step 420. At step 420, via satellite, a disable request may be transmitted to the subscriber's home television receiver. An identifier (e.g., address) of the home television receiver may be looked up by the SPMS in a stored database. As such, the disable request transmitted at step 420 may be addressed specifically to the home television receiver and transmitted via satellite. The disable request may be received by the home television receiver at step 422 via a tuner. The disable request may be in the form of an EMM. The EMM may configure a smart card or other form of security device of the home television receiver to block output (or access altogether) of some or all television channels. The EMM may be received by a tuner of the home television receiver via satellite in a satellite-based television distribution network. The EMM may be specifically addressed to the television receiver using an address or serial number of the smart card or television receiver.

In response to the disable request, output of television programming (which may include live television programming and/or record television programming) may be temporarily blocked. Rather, a message indicating that a temporary subscription port is in progress may be output for display. If the home television receiver is connected with a network that is in communication with the Internet, rather than transmitting the disable request via satellite, the Internet may be used.

Method 400 continues on FIG. 4B. At step 424, access for viewing of television channels that are available via the subscriber subscription may be blocked at the home television receiver. In some embodiments, if a network connection is available to a home television receiver, a confirmation may be transmitted to SPMS at step 426. This confirmation that access to television channels available through the subscriber subscription has been blocked may be received and logged at step 428 by the SPMS.

At step 430, the SPMS may transmit an enable request to the visitor television receiver, such as in the form of an EMM, that contains instructions enabling the subscriber subscription for use at the visitor television receiver. In some embodiments, the enable request transmitted at step 430 may only be transmitted if a confirmation is successfully received at step 428. In other embodiments, the confirmation may not be necessary. Rather, in such embodiments, the message containing the instructions to block access at the home television receiver may be periodically transmitted for the duration of the temporary subscription port.

At step 432, the enable request, which is addressed specifically to the visitor television receiver, may be received. The enable request may be received via a tuner of the visitor television receiver if the enable request was transmitted via satellite. If the visitor television receiver is in communication with a network that is connected to the Internet, the Internet may be used to transmit and receive the enable request. The enable request received at step 432 may indicate a predefined time at which the temporary subscription port is to revert. The enable request may also indicate a set of television channels to be made temporarily available at the visitor television receiver.

In some embodiments, the enable request may be in the form of an EMM. The EMM may configure a smart card or other form of security device of the visitor television receiver to permit output (but possibly not recording) of some or all television channels (likely, the television channels blocked at the home television receiver). The EMM may be received by a tuner of the visitor television receiver via satellite in a satellite-based television distribution network. The EMM may be specifically addressed to the visitor television receiver using an address or serial number of the visitor television receiver's smart card or the visitor television receiver.

At step 434, viewing of television channels under the subscriber's subscription may now be available. The television channels allowed to be viewed under the subscriber subscription may be in addition to television channels available under the visitor subscription already associated with the visitor television receiver, as such, television channels available during a temporary port may be a the set of television channels associated with the subscriber combined with a second set of television channels of the subscription associated with the visitor television receiver. In some embodiments, the television channels available via the visitor television subscription may be ignored. Therefore, following step 434, at least the television channels the subscriber is usually able to access via the home television receiver can now be viewed via the visitor television receiver. In some embodiments, while viewing of the television channels is permitted at step 434, recording of such television channels at the visitor television receiver is not.

At step 436, preferences of the subscriber may be loaded to the visitor television receiver. This may occur by the subscriber bringing his remote control from his home location to the visitor location to transfer preferences stored on the remote control as previously described. In other embodiments, the preferences may be loaded from the subscriber's mobile device or may be transmitted to the visitor television receiver by the SPMS.

During the period of time in which viewing of the television channels under the subscriber subscription is permitted at the visitor television receiver, timers previously defined at the home television receiver, if any, may still be executed at step 440. Therefore, although viewing of television programming is blocked at the home television receiver, timers may continue to be executed such that television programming is recorded by the home television receiver. Such recorded content may not be available for viewing until the temporary subscription port is finished.

At step 438, the temporary subscription port may end. The temporary subscription port may be finished due to a predefined period of time, such as 24 hours, having elapsed. In some embodiments, an amount of time defined as part of the temporary port request may have completed. In still other embodiments, the subscriber may have submitted, via the mobile device, a request that the temporary subscription port be ended. In still other embodiments, the temporary subscription port may be ended based on the subscriber's mobile device no longer being located in the vicinity of the visitor television receiver. In some embodiments, just as the SPMS transmitted enable and disable requests via satellite to the home television receiver and visitor television receiver, an enable request may be transmitted to the home television receiver at step 442 and a disable request may not be transmitted to the visitor television receiver at step 438. When the temporary subscription port is finished, the visitor television receiver may be instructed to allow access to television channels associated with the visitor subscription, with which the visitor television receiver was associated prior to the temporary subscription port.

Figure 5:
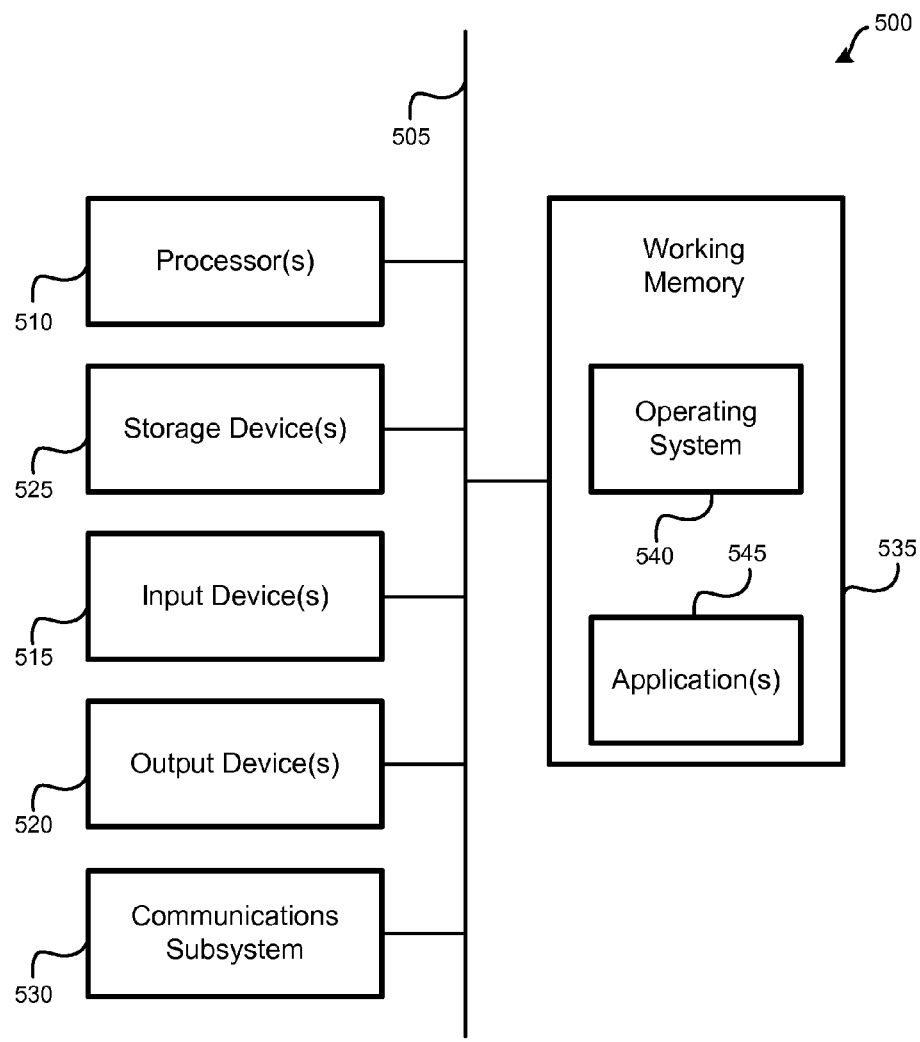
FIG. 5 illustrates an embodiment of a computer system.

A computer system as illustrated in FIG. 5 may be incorporated as part of the previously described computerized devices, such as the television receivers, remote controls, television service provider system, and/or the SPMS. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a keyboard, remote control, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for subscription porting, the system comprising:
   a subscription management computer system, configured to:
      receive, from a mobile device linked with a first subscriber, a temporary subscription port request, wherein:
         the temporary subscription port request comprises an identifier of a visitor television receiver, authentication information for the first subscriber, and an indication of a location of the mobile device;
      compare the location of the mobile device with a stored address linked with the visitor television receiver;
      in response to the temporary subscription port request, transmit a first command to a home television receiver that disables viewing a first set of television channels linked with a first subscription account, which is linked with the first subscriber; and
      in response to the temporary subscription port request and the location of the mobile device matching the stored address within a predefined threshold distance, transmit a second command to the visitor television receiver that enables viewing the first set of television channels linked with the first subscription account;
   the home television receiver, configured to:
      permit access to television channels based on received instructions; and
   the visitor television receiver, configured to:
      in response to user input, provide the identifier that identifies the visitor television receiver, wherein the identifier is unique among a plurality of television receivers in communication with the subscription management computer system; and
      permit access to television channels based on received instructions.

2. The system for subscription porting of claim 1, wherein:
   the identifier that identifies the visitor television receiver is represented as a graphical image; and
   the temporary subscription port request comprises a captured image of the graphical image.

3. The system for subscription porting of claim 1, wherein the home television receiver is further configured to:
   record television programming based on one or more timers while viewing of the first set of television channels of the first subscription account is disabled.

4. The system for subscription porting of claim 3, wherein the recorded television programming is inaccessible while viewing of the first set of television channels of the first subscription account is disabled.

5. The system for subscription porting of claim 1, wherein the second command authorizes viewing of the first set of television channels for a predefined period of time.

6. The system for subscription porting of claim 1, wherein:
   the home television receiver is configured to transmit, via a network, a confirmation to the subscription management computer system that indicates viewing of the first set of television channels has been disabled in response to the first command;
   the subscription management computer system is further configured to transmit, the second command to the visitor television receiver that enables viewing of the first set of television channels after receiving the confirmation from the home television receiver.

7. The system for subscription porting of claim 1, wherein:
the visitor television receiver is configured to send the identifier of the visitor television receiver via a local wireless network to a mobile device of the first subscriber; and
the subscription management computer system is further configured to receive the temporary subscription port request from the mobile device of the first subscriber.

8. The system for subscription porting of claim 1, the system further comprising:
a remote control, configured to:
store a set of user preferences that were set by the first subscriber at the home television receiver; and
transmit the set of user preferences to the visitor television receiver while the remote control is used with the visitor television receiver.

9. A method for subscription porting, the method comprising:
in response to user input, providing, by a visitor television receiver, an identifier that identities the visitor television receiver, wherein the identifier is unique among a plurality of television receivers in communication with a subscription management computer system;
receiving, by the subscription management computer system, from a mobile device linked with a first subscriber, a temporary subscription port request, wherein:
the temporary subscription port request comprises the identifier of the visitor television receiver, authentication information for the first subscriber, and an indication of a location of the mobile device;
comparing, by the subscription management computer system, the location of the mobile device with a stored address linked with the visitor television receiver;
in response to the temporary subscription port request, transmitting, by the subscription management computer system, a first command to a home television receiver that disables viewing a first set of television channels linked with a first subscription account, which is linked with the first subscriber; and
in response to the temporary subscription port request and the location of the mobile device matching the stored address within a predefined threshold distance, transmitting, by the subscription management computer system, a second command to the visitor television receiver that enables viewing the first set of television channels linked with the first subscription account.

10. The method for subscription porting of claim 9, wherein:
the identifier that identifies the visitor television receiver is a represented as graphical image; and
the temporary subscription port request comprises a captured image of the graphical image.

11. The method for subscription porting of claim 9, further comprising:

recording, by the home television receiver, television programming based on one or more timers while output for viewing of the first set of television channels of the first subscription account is disabled.

12. The method for subscription porting of claim 11, further comprising:
blocking, by the home television receiver, output of the recorded television programming while viewing of the first set of television channels of the first subscription account is disabled.

13. The method for subscription porting of claim 9, further comprising:
transmitting, by the home television receiver via a network, a confirmation to the subscription management computer system that indicates viewing of the first set of television channels has been disabled in response to the first command; and wherein
the subscription management computer system is further configured to transmit, the second command to the visitor television receiver that enables viewing of the first set of television channels after receiving the confirmation from the home television receiver.

14. A non-transitory processor-readable medium for subscription porting, comprising processor-readable instructions configured to cause one or more processors to:
receive, from a mobile device associated with a first subscriber, a temporary subscription port request, wherein:
the temporary subscription port request comprises an identifier of a visitor television receiver, authentication information for the first subscriber, and an indication of a location of the mobile device; and
the identifier is unique among a plurality of television receivers associated with a television service provider;
compare the location of the mobile device with a stored address linked with the visitor television receiver;
in response to the temporary subscription port request and the location of the mobile device matching the stored address within a predefined threshold distance, transmit a first command to a home television receiver that disables viewing a first set of television channels linked with a first subscription account, which is linked with the first subscriber; and
in response to the temporary subscription port request, transmit a second command to the visitor television receiver that enables viewing the first set of television channels linked with the first subscription account.

15. The non-transitory processor-readable medium for subscription porting of claim 14, wherein:
the identifier of the visitor television receiver is a graphical image; and
the temporary subscription port request comprises a captured image of the graphical image.

* * * * *